June 10, 1930.  R. S. SANFORD  1,762,640
MOTOR VEHICLE BODY
Filed Feb. 28, 1927
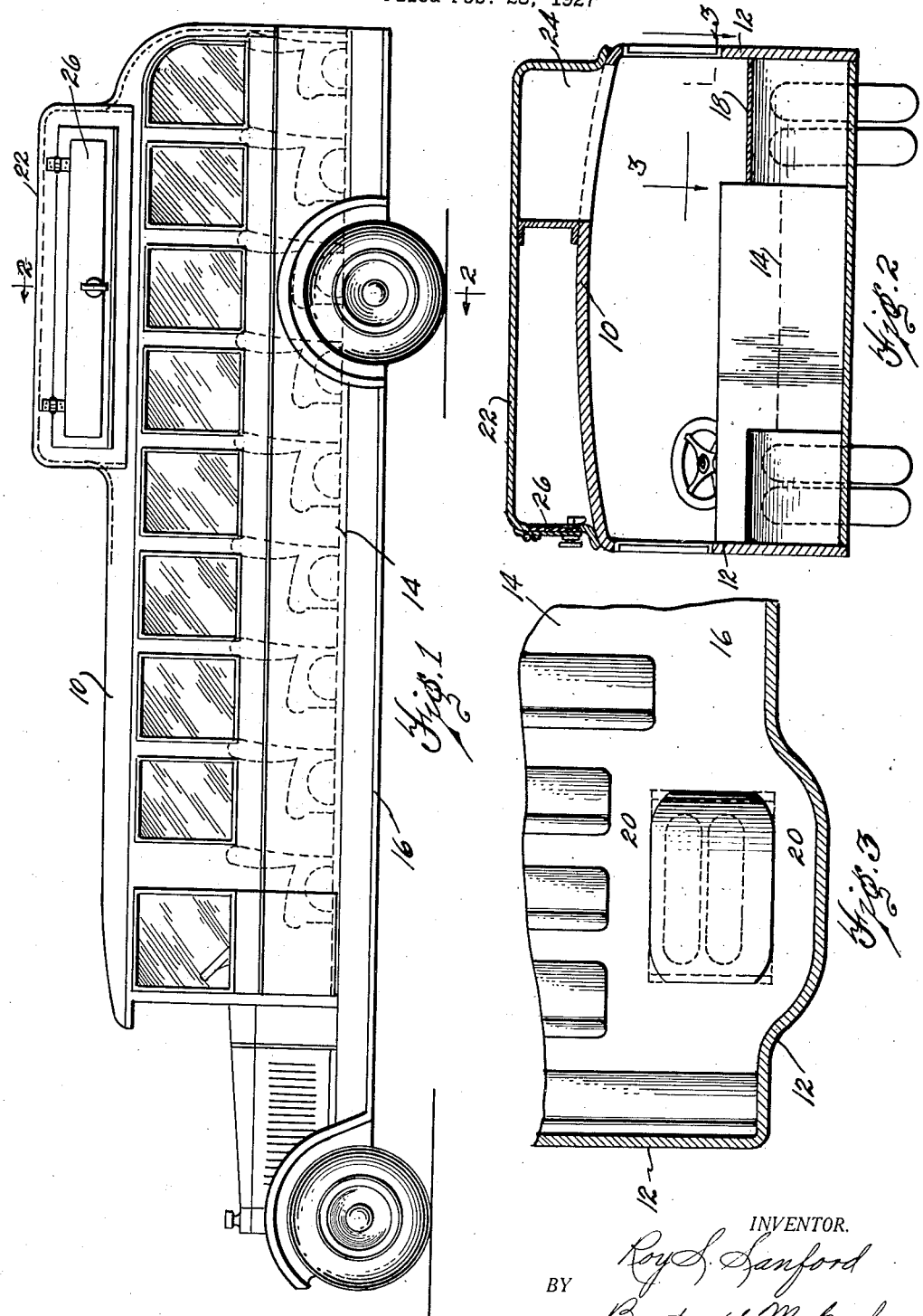
INVENTOR.
Roy S. Sanford
BY
Burton & McConkey
ATTORNEYS Patented June 10, 1930

1,762,640

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

MOTOR-VEHICLE BODY

Application filed February 28, 1927. Serial No. 171,506.

My invention relates to improvements in omnibus bodies, commercially known as bus bodies.

An object is to provide a bus body so constructed and arranged and so mounted upon the vehicle chassis as to provide for the comfortable accommodation of the largest number of passengers and to provide in a highly satisfactory manner for the receiving and discharging of passengers.

More specifically an object is the provision of a bus body of such a character wherein the floor of the body is formed at two levels—an upper level of such a height as to clear the frame, drive shaft, etc., of the chassis, and a lower level within the body adjacent to one side thereof and substantially in line with the wheels of the chassis on such side, which lower level is disposed substantially below the upper level and preferably below the frame and drive shaft of the chassis.

Other advantageous objects and meritorious features of my improvement will more full appear from the following specification, appended claims, and accompanying drawing, wherein:

Fig. 1 is a side elevation of a bus having a body embodying my invention.

Fig. 2 is a cross sectional view taken on line 2—2 of Fig. 1.

Fig. 3 is a fragmentary, horizontal sectional view taken on line 3—3 of Fig. 2, but of a modified form of construction.

In the drawing I have shown a four-wheeled road vehicle of the bus type provided with a closed body containing a plurality of seats arranged in successive, transverse tiers. The chassis of the vehicle is provided with the usual frame and drive shaft and other structural features common and well known in the art. The body is suitably supported upon the frame of the chassis and comprises a top 10, sides 12, and a floor 14. The floor is formed in two levels. The higher level is the one upon which the seats are arranged; the lower level is indicated as 16 and extends lengthwise of the body along one side wall 12 and substantially in line with the wheels on such side. This lower level 16 is depressed substantially below the upper level and preferably below the level of the frame of the chassis and forms an aisle alongside the seats for the movement of passengers from front to rear of the bus. As shown in Fig. 2 the aisle is provided with an elevated portion 18 which extends over the rear wheels. In Fig. 3, however, the aisle is divided forming a pair of passageways 20, one on each side of the rear wheels.

The bus body is provided with a superstructure or roof compartment 22 which extends transversely thereof substantially in line with the rear wheel. This compartment has a portion 24 directly above the aisle which is open to the aisle providing head clearance for the movement of passengers. The remaining portion of the compartment may be used as a baggage compartment and fitted with a door 26.

What I claim is:

1. In a bus, a chassis, a closed body upon the chassis, said body having a floor provided with an aisle along one side wall and in line with the wheels on said side of the chassis, said aisle disposed below the remaining portion of the floor and provided with a transversely offset portion at the same level extending to one side of the rear wheel on the same side of the chassis.

2. In a bus, a chassis, a closed body upon the chassis, said body having a floor provided with an aisle along one side wall and in line with the wheels on said side of the chassis, said aisle disposed below the remaining portion of the floor and provided with a transversely offset portion extending on each side of the rear wheel on the same side of the chassis.

3. In a bus, a chassis, a closed body upon the chassis, said body having a roof, sides, and a floor, said floor provided with an aisle along one side wall of the body substantially in line with the wheels on the same side of the chassis and depressed below the remaining portion of the floor between the wheels and extending above the floor at the rear wheel, said body provided with a superstructure projecting upwardly from the roof in line with the rear wheels which extends transversely of the body and has that portion immediately above the aisle open to the aisle.

In testimony whereof, I, ROY S. SANFORD, sign this specification.

ROY S. SANFORD.